United States Patent
Tanimura

(10) Patent No.: US 7,409,513 B2
(45) Date of Patent: Aug. 5, 2008

(54) INFORMATION PROCESS DEVICE AND METHOD FOR VERIFYING DISCRIMINATIVE INFORMATIONS

(75) Inventor: Tatsuhiko Tanimura, Tokyo (JP)

(73) Assignee: ARUZE Corp., Koto-ku, Tokyo (JP)

( * ) Notice: Subject to any disclaimer, the term of this patent is extended or adjusted under 35 U.S.C. 154(b) by 241 days.

(21) Appl. No.: 11/221,893

(22) Filed: Sep. 9, 2005

(65) Prior Publication Data

US 2006/0077768 A1  Apr. 13, 2006

(30) Foreign Application Priority Data

Sep. 13, 2004  (JP) ............................. 2004-265286

(51) Int. Cl.
*G06F 12/14* (2006.01)
*G06F 12/16* (2006.01)

(52) U.S. Cl. ...................................... 711/163; 711/164
(58) Field of Classification Search ................. 711/163, 711/164
See application file for complete search history.

(56) References Cited

U.S. PATENT DOCUMENTS

| 4,799,635 | A | 1/1989 | Nakagawa |
| 5,014,982 | A | 5/1991 | Okada et al. |
| 5,592,651 | A | 1/1997 | Rackman |
| 6,737,956 | B1 | 5/2004 | Kimura |
| 2002/0002688 | A1 * | 1/2002 | Gregg et al. ................. 713/202 |
| 2003/0212871 | A1 | 11/2003 | Suzuki et al. |

FOREIGN PATENT DOCUMENTS

| EP | 0 447 043 A2 | 2/1991 |
| EP | 0 754 999 A1 | 2/1996 |
| EP | 1 168 259 A2 | 1/2002 |
| JP | 2001-344096 | 12/2001 |
| JP | 2002-011209 | 1/2002 |
| JP | 2006014892 A * | 1/2006 |

OTHER PUBLICATIONS

European Search Report dated May 16, 2008.

* cited by examiner

*Primary Examiner*—Pierre-Michel Bataille
*Assistant Examiner*—Hetul Patel
(74) *Attorney, Agent, or Firm*—McGinn IP Law Group, PLLC

(57) ABSTRACT

In the information process device 1, only when it is determined that the password rewritten in the change password memory area 14a of the backup RAM 14 and the password rewritten in the change password memory area 31a of the second flash memory 31 coincide with each other (S202: YES), the menu display of the liquid crystal display 21 is conducted (S107) and it is permitted to start execution of the application program (S123) based on that the menu M2 of "2. start of game" is selected in the menu display. Further, based on that the menu M1 of "1. set of password" is selected in the menu display (S109: 1), it is permitted input of the change password by touching each of the areas 22c to 22n of the transparent touch panel 22 (S112).

17 Claims, 6 Drawing Sheets

INFORMATION PROCESS DEVICE AND METHOD FOR VERIFYING DISCRIMINATIVE INFORMATIONS

CROSS-REFERENCE TO THE RELATED APPLICATIONS (S)

This application is based upon and claims a priority from the prior Japanese Patent Application No. 2004-265286 filed on Sep. 13, 2004, the entire contents of which are incorporated herein by reference.

BACKGROUND OF THE INVENTION

1. Field of the Invention

The present invention relates to an information process device in which illegal use of software stored in an extension board can be avoided.

2. Description of Related Art

Among conventional information process devices, for example, there exists an information process device in which an extension board installing a flash memory and the like storing game soft programs is used and the game soft programs are operated. Therefore, different game soft programs can be provided to such information process device by using another extension board.

And in the above method to provide the game soft programs, there is a case that the game soft programs stored in the extension board are illegally used, therefore in order to avoid the illegal use of the game soft programs a security system is required in the information process device. Thus, for example, as described in Unexamined Japanese Publication No. 2001-344096, it is disclosed an information process device in which discriminative information respectively stored in memory media of both a main body of the information process device and the game soft program is compared with each other and it is determined whether or not the game soft program is executed, thereby security to avoid the illegal use of the game soft program is raised.

However, in the above method to raise security, if the security system is constructed beforehand at a supplier side supplying the extension board, the security system cannot be changed at all. Therefore, such security system cannot be improved into the security system on which intention at a user side using the extension board is reflected.

SUMMARY OF THE INVENTION

Thus, the present invention has been done and has an object to provide an information process device in which the security can be controlled by using discriminative information on which individual intention at the user side using the extension board is reflected.

In order to accomplish the above object, the present invention provides an information process device comprising:
  a mother board;
  a first memory area for storing first discriminative information therein, the first memory area being formed on the mother board;
  an extension board which is connectable to and detachable from the mother board;
  a second memory area for storing second discriminative information therein, the second memory area being formed on the extension board;
  an application program memory area for storing an application program therein, the application program memory area being formed on the extension board;
  a verification device for verifying a relation between the first discriminative information and the second discriminative information;
  a control device for starting execution of the application program when the verification device verifies that the relation between the first discriminative information and the second discriminative information is correct;
  the information process device further comprising:
  an input device for inputting third discriminative information;
  a first rewrite device for rewriting the first discriminative information to the third discriminative information input by the input device when the verification device verifies that the relation between the first discriminative information and the second discriminative information is correct; and
  a second rewrite device for rewriting the second discriminative information to the third discriminative information input by the input device when the verification device verifies that the relation between the first discriminative information and the second discriminative information is correct.

In the information process device according to the present invention, only when the verification device verifies that the relation between the first discriminative information and the second discriminative information is correct, the first rewrite device rewrites the first discriminative information to the third discriminative information and the second rewrite device rewrites the second discriminative information to the third discriminative information, and further it is permitted that the control device starts execution of the application program and a user side using the extension board can input the third discriminative information through the input device. Thereby, the user side using the extension board can control security of the information process device by using individual discriminative information.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings.

DETAILED DESCRIPTION OF THE PREFERRED EMBODIMENTS

Hereinafter, the embodiment of the present invention will be described with reference to the drawings.

Figure 1:
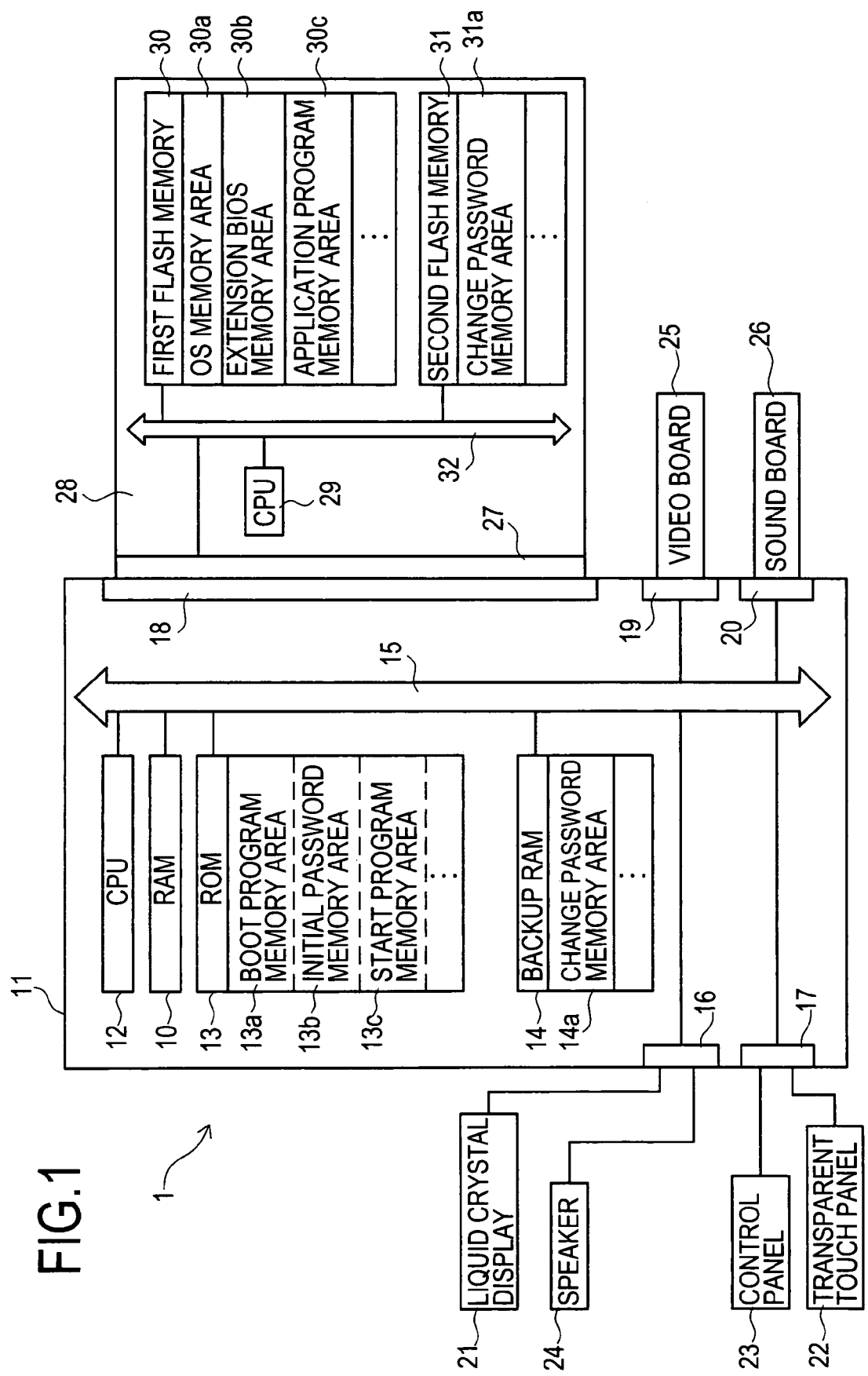
FIG. 1 is a block diagram of an information process device according to the embodiment.
Figure 2:
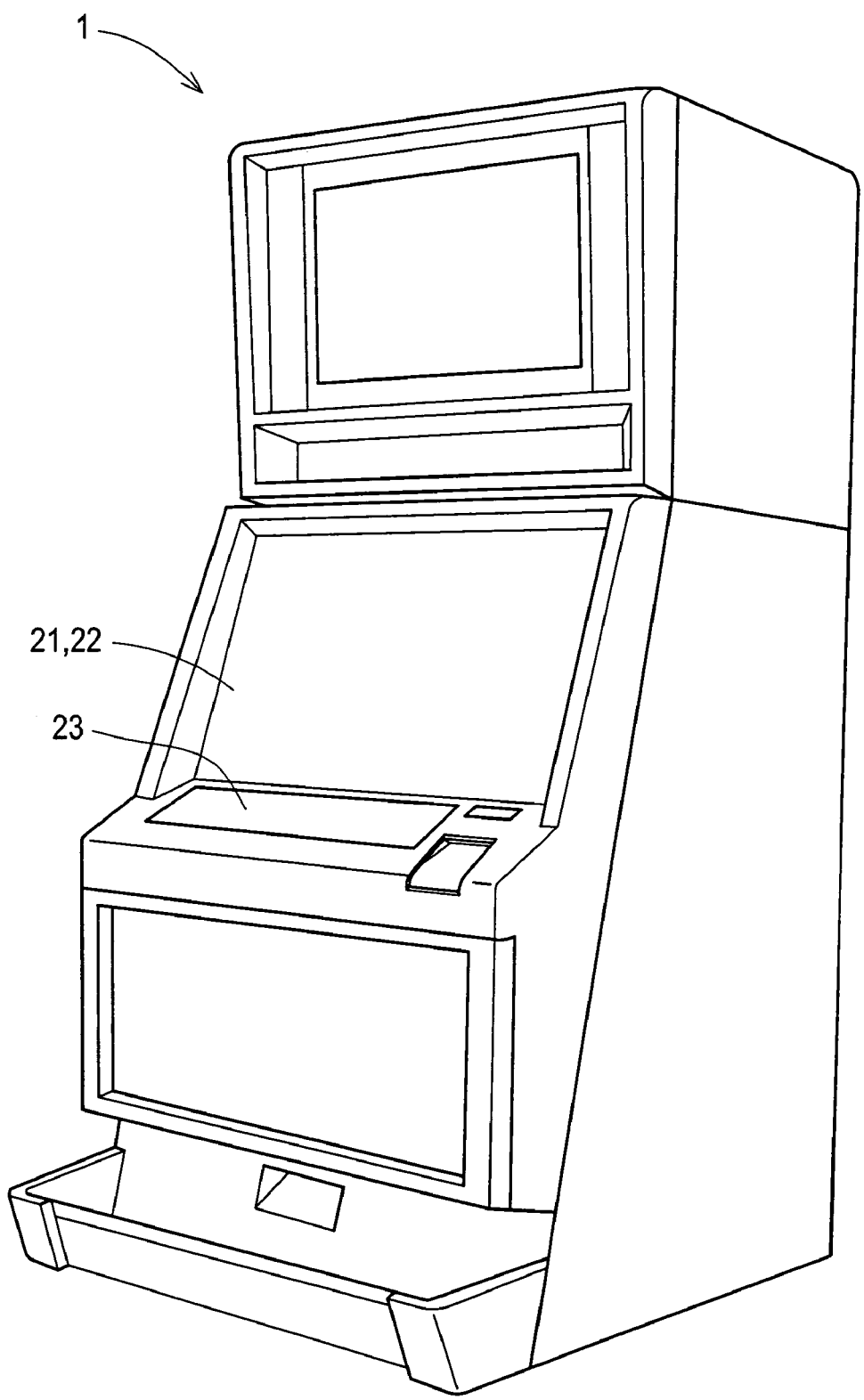
FIG. 2 is a perspective view showing the information process device according to the embodiment.

FIG. 1 is a block diagram of an information process device according to the embodiment. FIG. 2 is a perspective view showing the information process device according to the embodiment. As shown in FIG. 2, an information process device 1 of the embodiment is a gaming machine for business use, and it is used an OS (operating system) which is installed in a personal computer on the market. And under operating circumstance of the OS thereof a game soft program stored in a memory board mentioned later is operated.

And as shown in FIG. 1, in the information process device according to the embodiment, a CPU 12, a ROM 13, a RAM 10, a backup RAM 14, a buss 15, connectors 16, 17, a port 18 and extension slots 19, 20 are arranged on a mother board 11.

Here, the CPU 12 controls the information process device 1 and executes various programs.

And the ROM 13 is an non-volatile memory in which various control programs required when the information process device 1 of the embodiment is started to operate are stored. And in the ROM 13, as shown in FIG. 1, a boot program memory area 13a in which a boot program is stored beforehand, an initial password memory area 13b in which an initial password is stored beforehand and a start program memory area 13c in which a start program is stored, are formed.

Here, the boot program and the start program stored in each of the memory areas 13a, 13b of the ROM 13 will be described hereinafter.

And the RAM 10 is a memory in which the program executed by the CPU 12 is loaded and various data calculated when the program is executed by the CPU 12 are temporarily stored.

Further, the backup RAM 14 is a memory to retain contents by using electric cells. And in the backup RAM 14, as shown in FIG. 1, it is formed a change password memory area 14a and the like in which a change password is rewritten and stored.

And the buss 15 is a PCI buss in which a bridge circuit for converting frequency is provided and constructs a common signal line to communicate signals with the CPU 12, the ROM 13, the RAM 10, the backup RAM 14, the connectors 16, 17, the IDE port 18 and the extension slots 19, 20.

Further, the connector 16 is a device to connect a liquid crystal display 21 which is an output device required when the game soft program is operated and a speaker 24 to the mother board 11. In FIG. 1, although only one connector 16 is described, in a case that a plurality of output devices exist, an exclusive connector 16 is provided for each of the output devices, respectively.

Here, instead of the liquid crystal display 21, a CRT may be used.

And the connector 17 is a device to connect a control panel 23 and a transparent touch panel 22 to the mother board 11. In FIG. 1, although only one connector 17 is described, in a case that a plurality of input devices, an exclusive connector 17 is provided for each of the input devices, respectively. And in the control panel 23, there are provided a plurality of button switches (not shown) required when the game soft program is operated. And the transparent touch panel 22 connected to the connector 17 is arranged on a front plane of the liquid crystal display 21 so as to superimpose therewith and can detect a touch position where the player touches based on coordinate position information of the touch position.

Here, as the input device such as the transparent touch panel 22, a keyboard or a mouse may be used, and there will be a case that a joystick is connected to the connector 17.

And to the IDE port 18, a memory board 28 is connected through a conversion adaptor 27.

Further, on the memory board 28 connected to the IDE port 18, a CPU 29, a first flash memory 30, a second flash memory 31 and a buss 32 are provided.

Here, the CPU 29 controls storing operation on the memory board 28. And in the first flash memory 30, an OS memory area 30a in which the OS (Operating System) is stored, an extension BIOS (Basic Input Output system) memory area 30b in which an extension BIOS is stored and an application program memory area 30c in which application programs as the game soft programs are stored, are formed. And in the second flash memory 31, it is formed a change password memory area 31a in which a change password is rewritten and stored. However, in the change password memory area 31a of the second flash memory 31, it is written a password which is as same as an initial password stored beforehand in the initial password memory area 13b in an initial set state. Further, the buss 32 is a common signal line to communicate signals with the conversion adaptor 27, the CPU 29, the first flash memory 30 and the second flash memory 31.

Here, although a compact flash (registered trade mark) is used as the memory board 28 on which the first flash memory 30 and the second flash memory 31 are mounted, the other devices may be used.

And the extension slots 19 is a slot to connect a video board 25 to the mother board 11.

Here, the video board 25 connected through the extension slot 19 is a board in which a graphic accelerator to display figures and characters on the liquid crystal display 21 is provided, and the video board 25 has performance with resolution and graphic speed having a level capable of executing the game soft programs in the information process device 1 of the embodiment.

And the extension slot 20 is a slot to connect a sound board 26 to the mother board 11.

Here, on the sound board 26 connected through the extension slot 20, there is mounted a chip such as FM sound source and PCM sound source through which sounds are output from the speaker 24. Such chip has performance having a level capable of executing the game soft programs in the information process device 1 of the embodiment.

Figure 3:
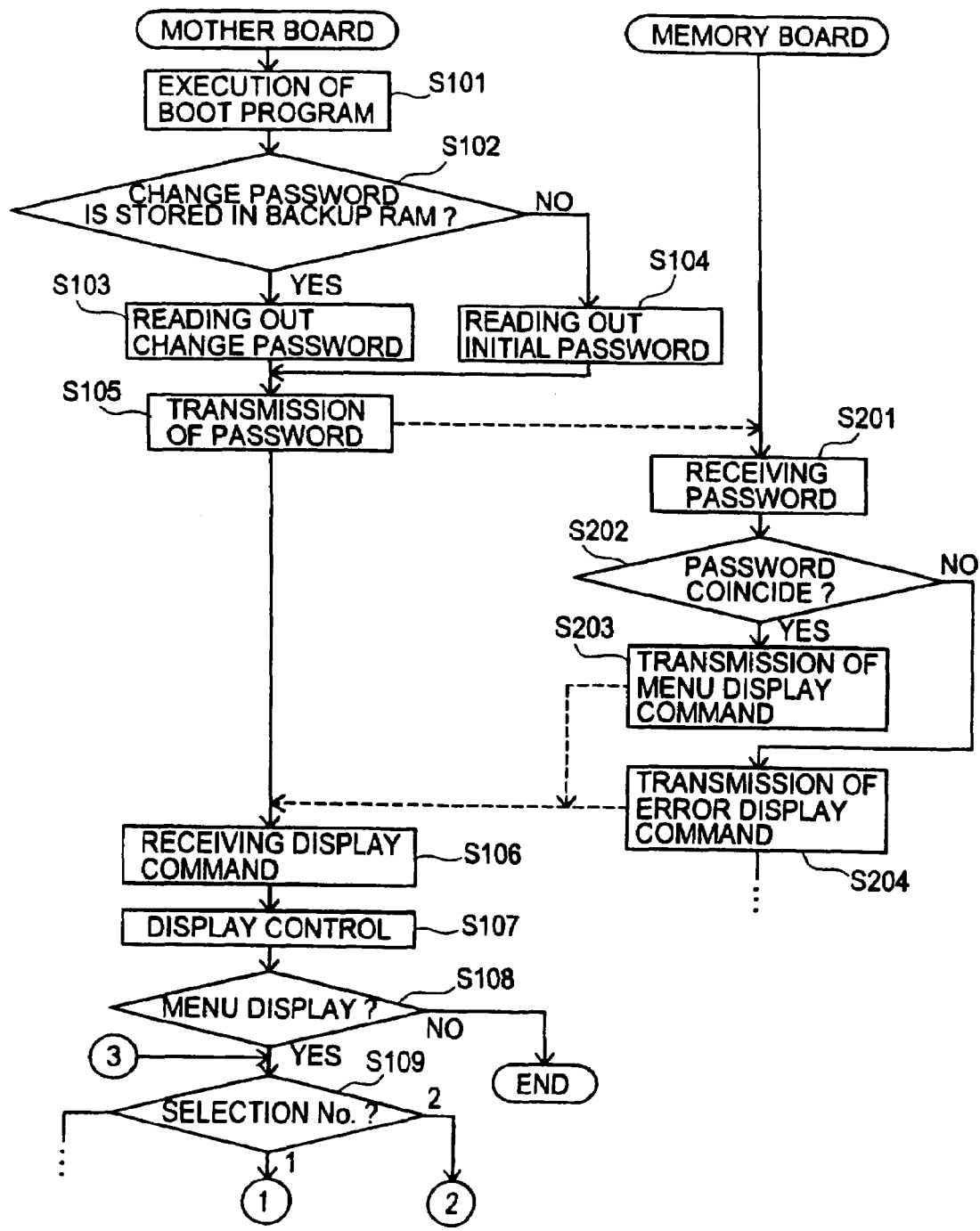
FIG. 3 is a flowchart of a start program executed when the information process device of the embodiment is started to operate.
Figure 4:
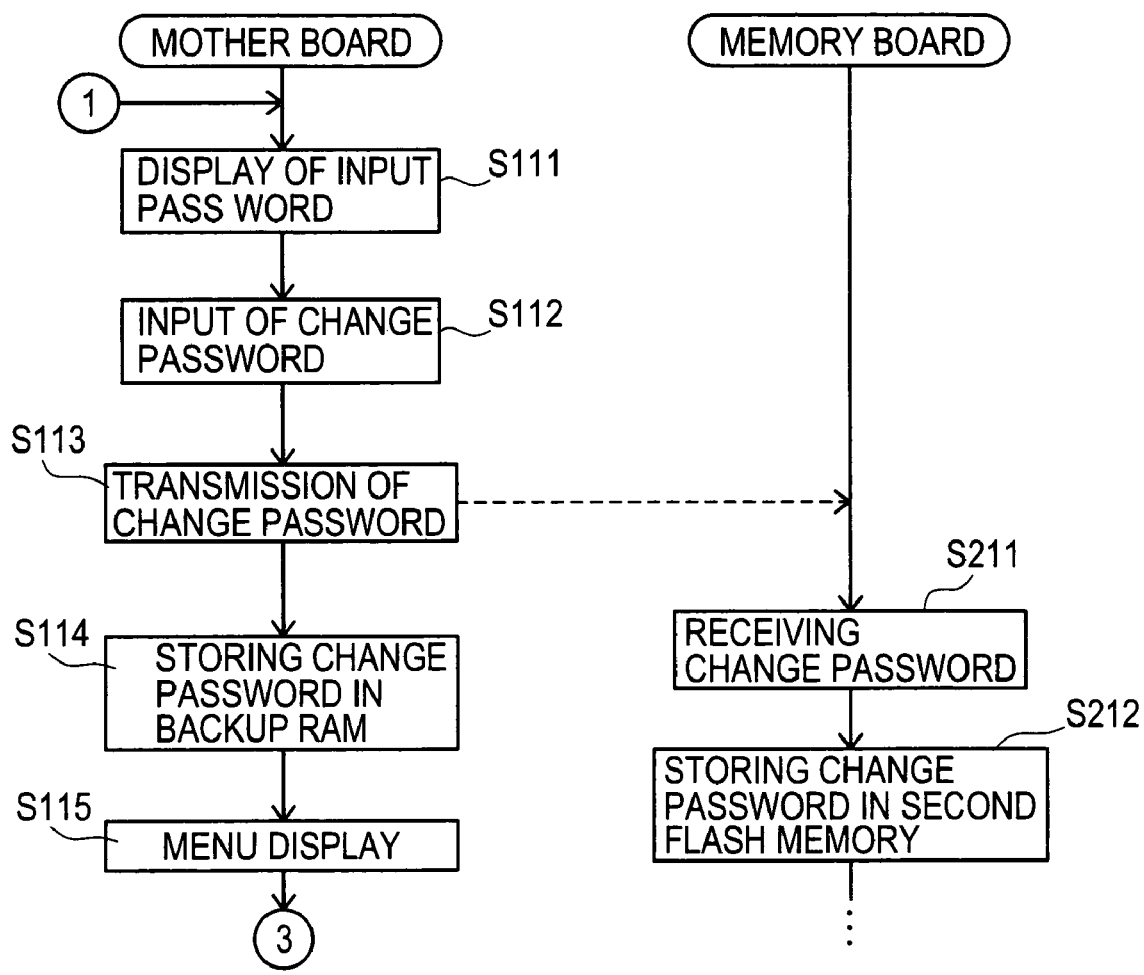
FIG. 4 is a flowchart of the start program executed when the information process device of the embodiment is started to operate.
Figure 5:
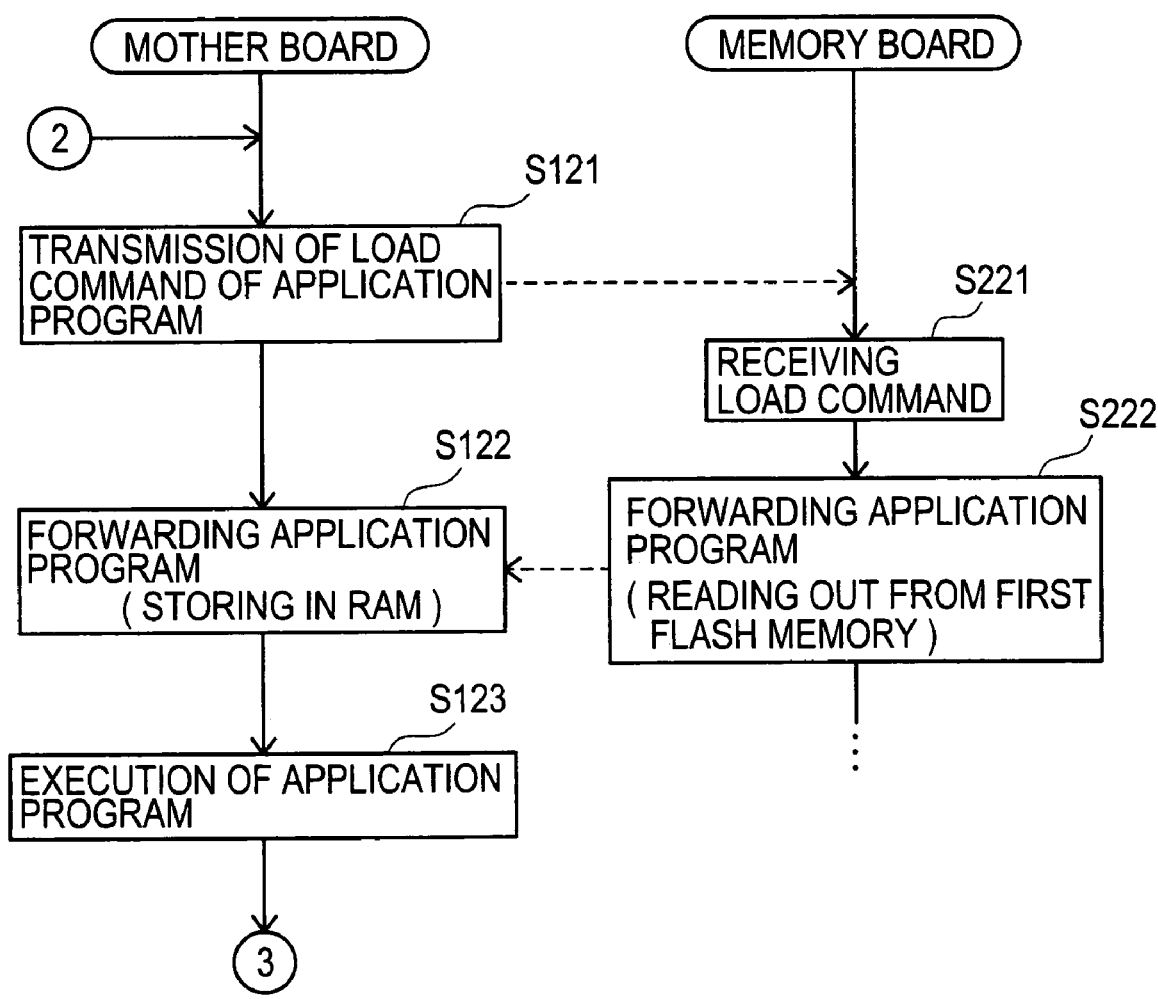
FIG. 5 is a flowchart of the start program executed when the information process device of the embodiment is started to operate.

Next, operation when the information process device 1 is started to operate will be described with reference to flowcharts shown in FIGS. 3 to 5. FIGS. 3 to 5 show flowcharts of a start program executed when the information process device of the embodiment is started to operate.

In the information process device according to the embodiment, when started to operate, a start program stored in the start program memory area 13c of the ROM 13 is executed by the CPU 12 on the mother board 11 and the CPU 29 on the memory board 28.

That is to say, when the start program is executed, at first a boot program is executed by the CPU 12 on the mother board 11.

Here, the boot program is stored in the boot program memory area 13a of the ROM 13, and when the boot program is executed, it is conducted initialization of various devices including the extension BIOS (Basic Input Output System) stored in the first flash memory 30 and the OS (Operating System) stored in the first flash memory 30.

At that time, the OS (Operating System) in the first flash memory 30 is loaded in the RAM 10 and started to operate, therefore at this point of view, the ROM 13 corresponds to the boot ROM.

Next, in the start program, when procedure shifts to S102, the CPU 12 on the mother board 11 determines whether or not the change password is stored in the change password memory area 14a of the backup RAM 14. At that time, if it is determined that the change password is stored in the change password memory area 14a of the backup RAM 14 (S102: YES), the change password stored in the change password memory area 14a of the backup RAM 14 is read out by the CPU 12 on the mother board 11 in S103, thereafter procedure shifts to S105. On the other hand, if it is determined that the change password is not stored in the change password memory area 14a of the backup RAM 14 (S102: NO), the initial password stored in the initial password memory area 13b of the ROM 13 is read out by the CPU 12 on the mother board 11, thereafter procedure shifts to S105.

In S105, the change password read out in S103 or the initial password read out in S104 is transmitted to the memory board 28 by the CPU 12 on the mother board 11.

Thereafter, the CPU 29 on the memory board 28 receives in S201 the password transmitted from the mother board 11 in S105, and procedure shifts to S202. And in S202, the CPU 29 on the memory board 28 determines whether or not the password received in S201 coincides with the change password stored in the change password memory area 31a of the second flash memory 31. At that time, if it is determined that both passwords coincide with each other (S202: YES), procedure shifts to S203, and the CPU 29 on the memory board 28 transmits a menu display command to the mother board 11. On the other hand, if it is determined that both passwords do not coincide with each other (S202: NO), procedure shifts to S204, and the CPU 29 on the memory board 28 transmits an error display command to the mother board 11.

Thereafter, the CPU 12 on the mother board 11 receives in S106 the menu display command transmitted from the memory board 28 in S203 or the error display command transmitted from the memory board 28 in S204, and procedure shifts to S107. And in S107, according to the display command received in S106, the CPU 12 on the mother board 11 conducts the menu display or the error display on the liquid crystal display 21, thereafter procedure shifts to S108.

In S108, the CPU 12 on the mother board 11 determines whether or not the menu display is conducted on the liquid crystal display 21. At that time, if it is determined that the menu display is not conducted on the liquid crystal display 21 (S108: NO), the start program is terminated. On the other hand, if it is determined that the menu display is conducted on the liquid crystal display 21 (S108: YES), procedure shifts to S109.

Figure 6:
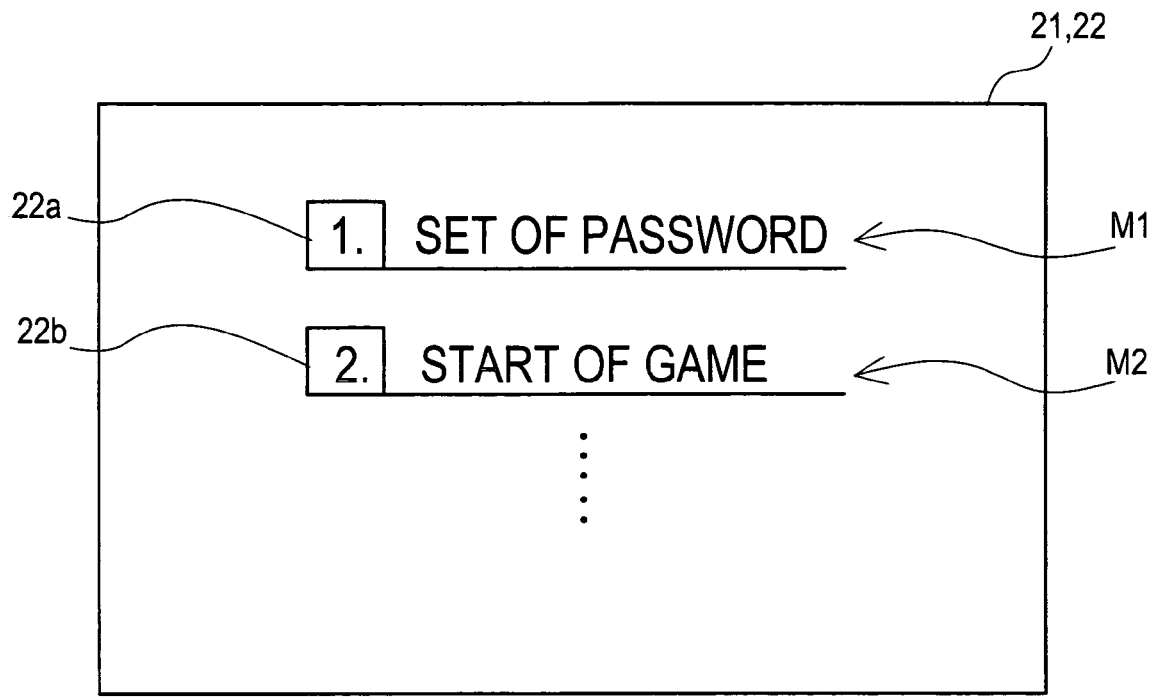
FIG. 6 is an explanatory view showing an image of a menu display displayed on a liquid crystal display.

Here, the menu display on the liquid crystal display 21 will be explained with reference to FIG. 6. FIG. 6 is an explanatory view showing an image display plane of the menu display conducted on the liquid crystal display 21. In S107, if the menu display is conducted on the liquid crystal display 21, a menu M1 of "1. set of password" and a menu M2 of "2. start of game", and the other menu (not shown) are displayed in order. And if the player touches an area 22a of the transparent touch panel 22, the area 22a enclosing the numeral "1." of the menu M1 displayed on the liquid crystal display 21, the menu M1 of "1. set of password" can be selected and if the player touches an area 22b of the transparent touch panel 22, the area 22b enclosing the numeral "2." of the menu M2 displayed on the liquid crystal display 21, the menu M2 of "2. start of game" can be selected. Here, although not shown in FIG. 6, the same operation is conducted when the other menu displayed on the liquid crystal display 21 is selected.

And returning to FIG. 3, in S109, the CPU 12 on the mother board 11 determines what numeral is selected by the areas 22a, 22b of the transparent touch panel 22. At that time, if the numeral selected is "1" (S109: 1), procedure shifts to S111 in FIG. 4, and a mode to set the password is realized. On the other hand, if the numeral selected is "2" (S109: 2), procedure shifts to S121 in FIG. 5, and a mode to start the game is realized. Here, although not shown in FIG. 6, the same operation is conducted when the other numeral corresponding to the other menu displayed on the liquid crystal display 21 is selected.

Figure 7:
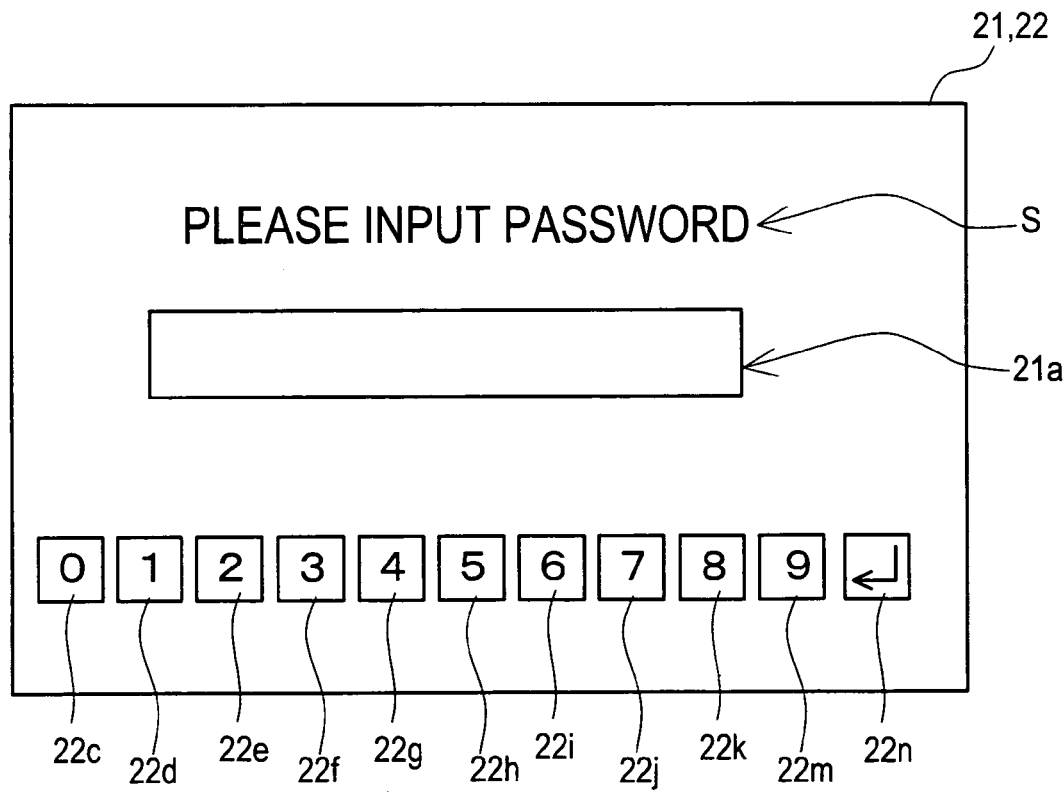
FIG. 7 is an explanatory view showing an input image plane of a change password displayed on the liquid crystal display.

Here, the mode to set the password will be explained. When the mode to set the password is realized, procedure shifts to S111 in FIG. 4 and an input image plane of the change password is displayed on the liquid crystal display 21 under control by the CPU 12 on the mother board 11. Here, display of the input image plane of the change password is displayed on the liquid crystal display 21 as shown in FIG. 7. FIG. 7 is an explanatory view showing an input image plane of a change password displayed on the liquid crystal display.

That is to say, in S111, when the display of the input image plane of the change password is displayed on the liquid crystal display 21, a message S "PLEASE INPUT PASSWORD" is displayed on the liquid crystal display 21 and a frame 21a for displaying the password input is displayed. Further, under the frame 21a, numerals of "0", "1", "2", "3", "4", "5", "6", "7", "8", "9" and an enter mark are displayed along a horizontal line.

And when an area 22c of the transparent touch panel 22 enclosing the numeral "0" displayed on the liquid crystal display 21 is touched, a signal corresponding to the numeral "0" can be input. And when an area 22d of the transparent touch panel 22 enclosing the numeral "1" displayed on the liquid crystal display 21 is touched, a signal corresponding to the numeral "1" can be input. And when an area 22e of the transparent touch panel 22 enclosing the numeral "2" displayed on the liquid crystal display 21 is touched, a signal corresponding to the numeral "2" can be input. And when an area 22f of the transparent touch panel 22 enclosing the numeral "3" displayed on the liquid crystal display 21 is touched, a signal corresponding to the numeral "3" can be input. And when an area 22g of the transparent touch panel 22 enclosing the numeral "4" displayed on the liquid crystal display 21 is touched, a signal corresponding to the numeral "4" can be input.

Further, when an area 22h of the transparent touch panel 22 enclosing the numeral "5" displayed on the liquid crystal display 21 is touched, a signal corresponding to the numeral "5" can be input. And when an area 22i of the transparent touch panel 22 enclosing the numeral "6" displayed on the liquid crystal display 21 is touched, a signal corresponding to the numeral "6" can be input. And when an area 22j of the transparent touch panel 22 enclosing the numeral "7" displayed on the liquid crystal display 21 is touched, a signal corresponding to the numeral "7" can be input. And when an area 22k of the transparent touch panel 22 enclosing the numeral "8" displayed on the liquid crystal display 21 is touched, a signal corresponding to the numeral "8" can be input. And when an area 22m of the transparent touch panel 22 enclosing the numeral "9" displayed on the liquid crystal display 21 is touched, a signal corresponding to the numeral "9" can be input.

Further, when an area 22*n* of the transparent touch panel 22 enclosing the enter mark displayed on the liquid crystal display 21 is touched, a signal corresponding to termination of input can be input.

And in the mode to set password, when procedure shifts to S112, the change password is input by the CPU 12 on the mother board 11. At that time, the password is constructed from the numeral with one digit or more than two digits and such password can be input through each of the areas 22*c* to 22*n* of the transparent touch panel 22. And the numeral input is displayed within the frame 21*a* of the liquid crystal display 21.

Here, when the area 22*n* of the transparent touch panel 22 is touched, the change password input in S112 is decided, and procedure shifts to S113. In S113, the change password is transmitted to the memory board 28 by the CPU 12 on the mother board 11. At that time, in transmission of the change password, the encoded change password may be transmitted. Thereafter, procedure shifts to S114 and the change password is rewritten in the change password memory area 14*a* of the backup RAM 14 and stored therein by the CPU 12 on the mother board 11. Thereafter, procedure shifts to S115 and the menu display is conducted on the liquid crystal display 21 by the CPU 12 on the mother board 11 and procedure returns to S109 of FIG. 3.

On the other hand, in S211, the CPU 29 on the memory board 28 receives the change password transmitted from the mother board 11 in S113, thereafter procedure shifts to S212. In S212, the change password received is rewritten in the change password memory area 31*a* of the second flash memory 31 and stored therein by the CPU 29 on the memory board 28.

Next, the mode to start the game will be explained. When the mode to start the game is realized, procedure shifts to S121 of FIG. 5 and it is transmitted to the memory board 28 a load command for loading the application program, which is the game soft program, by the CPU 12 on the mother board 11.

Thereafter, after the CPU 29 on the memory board 28 receives the load command transmitted from the mother board 11 in S121, procedure shifts to S222. And in S222, the application program stored in the application program memory area 30*c* of the first flash memory 30 is read out and transmitted to the mother board 11 by the CPU 29 on the memory board 28, thereby the application program is forwarded.

At the same time, the CPU 12 on the mother board 11 stores the application program transmitted from the memory board 28 in S222 in the RAM 10, thereby the application program is forwarded.

And after procedure shifts to S123, the CPU 12 starts to execute the application program stored in the RAM 10.

As mentioned, the CPU 29 on the memory board 28 functions as "verification device" when the process in S202 of FIG. 3 is executed.

And the CPU 12 on the mother board 11 functions as "first rewrite device" when process the process in S114 of FIG. 4 is executed.

Further, the CPU 29 on the mother board 28 functions as "second rewrite device" when the process in S212 of FIG. 4 is executed.

And the CPU 12 on the mother board 11 functions as "control device" when the process in S123 of FIG. 5 is executed.

As mentioned in the above, in the information process device 1 according to the embodiment, after the change password is input (S112) by touching each of the areas 22*c* to 22*n* of the transparent touch panel 22, the change password input is rewritten in the change password memory area 14*a* of the backup RAM 14 (S114) and is rewritten in the change password memory area 31*a* of the second flash memory 31 (S212). Here, only when it is determined that the password rewritten in the change password memory area 14*a* of the backup RAM 14 and the password rewritten in the change password memory area 31*a* of the second flash memory 31 coincide with each other (S202:YES), the menu display of the liquid crystal display 21 is conducted (S107) and it is permitted to start execution of the application program (S123) based on that the menu M2 of "2. start of game" is selected in the menu display. Further, based on that the menu M1 of "1. set of password" is selected in the menu display (S109: 1), it is permitted input of the change password by touching each of the areas 22*c* to 22*n* of the transparent touch panel 22 (S112), thereby the user side using the memory board 28 can control security of the information process device 1 on the basis of the individual change password.

And although the information process device 1 of the embodiment is used as the gaming machine for business use as shown in FIG. 2, the hall side (game arcade side) providing the gaming machine for the players becomes the user side using the memory board 28 at the same time, therefore security can be controlled based on the individual point of view at the hall side.

Here, the present invention is not limited to the embodiment mentioned in the above and various modifications may be done within the scope of the present invention.

For example, in the information process device 1 of the embodiment, although the start program shown in FIGS. 3 to 5 executed when the information process device 1 of the embodiment is started to operate is operated by the CPU 12 on the mother board 11 and the CPU 29 on the memory board 28, such start program shown in FIGS. 3 to 5 executed when the information process device 1 of the embodiment is started to operate may be operated only by the CPU 12 on the mother board 11.

And in the information process device 1 of the embodiment, in a case that plural game soft programs, that is, plural application soft programs are stored in the first flash memory 30, for example, the password memory area may be prepared for each of the application soft programs and the change password may be set for each of the application soft programs.

In the information process device 1 according to the embodiment, although the first flash memory 30 and the second flash memory 31 are individually provided on the memory board 28, one flash memory having both function of the first flash memory 30 and function of the second flash memory 31 may be provided on the memory board 28.

And in the embodiment, when the information process device 1 according to the embodiment is started to operate, the start program shown in FIGS. 3 to 5 is executed, thereby the menu display of the liquid crystal display 21 is conducted (S107). Here, even while the information process device 1 of the embodiment is operated, only when it is determined that the password rewritten in the change password memory area 14*a* of the backup RAM 14 and the password rewritten in the change password memory area 31*a* of the second flash memory 31 coincide with each other, the menu display of the liquid crystal display 21 may be conducted. And the menu display of the liquid crystal display 21 is unconditionally conducted and only when it is determined that the password rewritten in the change password memory area 14*a* of the backup RAM 14 and the password rewritten in the change password memory area 31*a* of the second flash memory 31 coincide with each other, it may be permitted to start execution of the application soft program based on that the menu M2 of "2. start of game" is selected in the menu display and it may be permitted to input the change password by touching each of the areas 22c to 22n of the transparent touch panel 22, based on that the menu M1 of "1. set of password" is selected in the menu display.

And in the information process device 1 of the embodiment, based on that it is determined whether or not the password rewritten in the change password memory area 14a of the backup RAM 14 and the password rewritten in the change password memory area 31a of the second flash memory 31 coincide with each other (S202), although it is verified whether or not corresponding relation between the password rewritten in the change password memory area 14a of the backup RAM 14 and the password rewritten in the change password memory area 31a of the second flash memory 31 is correct, it is not limited to a case that the password rewritten in the change password memory area 14a of the backup RAM 14 and the password rewritten in the change password memory area 31a of the second flash memory 31 coincide with each other, as a case that it is verified that the corresponding relation between the password rewritten in the change password memory area 14a of the backup RAM 14 and the password rewritten in the change password memory area 31a of the second flash memory 31 is correct. For example, such corresponding relation may be a numeral relation in which there is a difference in each digit between two numerals and a character relation in which there is a counter meaning relation between characters or in which there is a watchword relation between characters.

Further, in the information process device 1 of the embodiment, in a case that the password rewritten in the change password memory area 14a of the backup RAM 14 and the password rewritten in the change password memory area 31a of the second flash memory 31 coincide with each other (S202: YES), the menu display of the liquid crystal display 21 is conducted (S107). At that time, the menu display of the liquid crystal display 21 may be conducted based on that the menu display of the liquid crystal display 21 is not usually done, and the application programs stored in the application program memory area 30c of the first flash memory 30 is read out and transmitted to the mother board 11, and only when the application programs is started to operate while a predetermined switch is pressed.

And in the embodiment, although the CPU 12 on the mother board 11 rewrites the change password in the change password memory area 14a of the backup RAM 14 and stores therein, and functions as "first rewrite device", the CPU 29 on the memory board 28 or the other CPU may rewrite the change password in the change password memory area 14a of the backup RAM 14 and stores therein (S114 in FIG. 4), and function as "first rewrite device".

Further, in the embodiment, although the CPU 29 on the memory board 28 rewrites the change password in the change password memory area 31a of the second flash memory 31 (S212 in FIG. 4) and functions as "second rewrite device", the CPU 12 on the mother board 11 or the other CPU may rewrite the change password in the change password memory area 31a of the second flash memory 31 and function as "second rewrite device".

And in the information process device 1 of the embodiment, although the change password can be input by touching each of the areas 22c to 22n of the transparent touch panel 22 (S112), the change password may be input through the button switches (not shown) on the control panel 23.

The present invention can be adopted for security technology using the discriminative information such as password in the information process device using the extension board.

What is claimed is:

1. An information process device comprising:
a mother board;
a first memory area for storing first discriminative information therein, the first memory area being formed on the mother board;
an extension board which is connectable to and detachable from the mother board;
a second memory area for storing second discriminative infonnation therein, the second memory area being fonned on the extension board;
an application program memory area for storing an application program therein, the application program memory area being formed on the extension board;
a verification device for verifying a relation between the first discriminative information and the second discriminative information, the verification device being formed on the extension board;
a control device for staning execution of the application program when the verification device verifies that the relation between the first discriminative information and the second discriminative information is correct;
the information process device further comprising:
an input device for inputting third discriminative information;
a first rewrite device for rewriting the first discriminative information to the third discriminative information input by the input device when the verification device verifies that the relation between the first discriminative information and the second discriminative information is correct; and
a second rewrite device for rewriting the second discriminative information to the third discriminative information input by the input device when the verification device verifies that the relation between the first discriminative information and the second discriminative information is correct.

2. The information process device according to claim 1, wherein the first discriminative information comprises a first password, the second discriminative information comprises a second password and the third discriminative information comprises a third password.

3. The information process device according to claim 2, further comprising:
a display device for displaying a menu through which the third password is input in cooperation with the input device.

4. The information process device of claim 3, wherein the display device displays the menu including a mode to input the third password in cooperation with the input device when the control device starts execution of the application program.

5. The information process device according to claim 1, further comprising:
a third memory area for storing an initial password therein, the third memory area being formed on the mother board; and
a determination device for determining whether or not the first password is stored in the first memory area;
wherein the first rewrite device reads out the initial password from the third memory area and rewrites the first password to the initial password when the determination device determines that the first password is not stored in the first memory area.

6. The information process device according to claim 1, wherein the information process device is used as a gaming machine for business use.

7. The information process device of claim 1,
wherein the first memory area is located on a backup random access memory (RAM) on the mother board, and
wherein the second memory area is located on a flash memory on the extension board.

8. The information process device of claim 1,
wherein the first rewrite device is located on the mother board, and wherein the second rewrite device is located on the extension board.

9. An information process method, comprising:
storing a first discriminative information in a first memory area, the first memory area being formed on a mother board;
storing a second discriminative information in a second memory area, the second memory area being formed on the extension board;
storing an application program in an application program memory area, the application program memory area being formed on the extension board;
verifying a relation in a verification device between the first discriminative information and the second discriminative information, the verification device being formed on the extension board;
starting execution of the application program when the verification device verifies that the relation between the first discriminative information and the second discriminative information is correct;
inputting a third discriminative information;
rewriting the first discriminative information to the third discriminative information input by an input device when the verification device verifies that the relation between the first discriminative information and the second discriminative information is correct; and
rewriting the second discriminative information to the third discriminative information input by the input device when the verification device verifies that the relation between the first discriminative information and the second discriminative information is correct.

10. The information process method of claim 9, wherein the first discriminative information comprises a first password, the second discriminative information comprises a second password and the third discriminative information comprises a third password.

11. The information process method of claim 9, further comprising:
storing an initial password in a third memory area;
determining whether the first discriminative information is stored in the first memory area; and
reading out the initial password from the third memory area and rewriting the first discriminative information to the initial password when it is determined that the first discriminative information is not stored in the first memory area.

12. The information process method according to claim 9, wherein starting execution of the application program further comprises:
displaying a menu after verifying the relationship between the first discriminative information and the second discriminative information is correct.

13. The information process method according to claim 12, wherein inputting the third discriminative information occurs after selecting a mode to set one of the first discriminative information or the second discriminative information from the menu.

14. The information process method of claim 9, wherein inputting the third discriminative information occurs after storing the first discriminative information in the first memory area and storing the second discriminative information in the second memory area.

15. An information process device, comprising:
a first memory area for storing a first discriminative information;
a second memory area for storing a second discriminative information;
an input device for inputting a third discriminative information;
a first rewrite device for rewriting the first discriminative information as the third discriminative information input by the input device when the verification device verifies that a relation between the first discriminative information and the second discriminative information is correct; and
a second rewrite device for rewriting the second discriminative information as the third discriminative information input by the input device when the verification device verifies that the relation between the first discriminative information and the second discriminative information is correct, wherein the verification device verifies that the relation between the first discriminative information and the second discriminative information is correct when the first disc4riminative information and the second discriminative informationa are identical.

16. An information process device comprising:
a motherboard including:
a first Central Processing Unit (CPU);
a Read Only Memory (ROM) connected to the first CPU through a buss; and
a Random Access Memory (RAM) storing a first change password through the buss,
wherein the mother board is connected to an output device including a display device and an input device through the buss; and
an extension board including:
a second CPU; and
a memory storing a second change password and an application program, the memory being connected to the second CPU,
wherein the extension board is connectable to and detachable from the buss of the mother board through ports and is exchangeable against the mother board,
wherein the first CPU determines whether or not the first change password is stored in the RAM while executing a boot program,
wherein the first CPU transmits the first change password to the extension board when it is detennined that the first change password is stored in the RAM,
wherein the second CPU receives the first change password transmitted from the mother board and verifies whether or not the second change password stored in the memory of the extension board and the first change password coincide xvith each other,
wherein the second CPU outputs a command to display an error on the display device of the output device when the first change password received from the mother board and the second change password stored in the memory do not coincide with each other,
wherein the second CPU transmits a command to display a screen for changing the second change password on the display device when the first change password receive from the mother board and the second change password stored in the memory coincide with each other, wherein the first CPU displays the error on the display device of the output device when the command to display the error on the display device of the output device is received, wherein the first CPU displays an input screen of a third change password on the display device of the output device when the command to display the screen for changing the second change password on the display device is received, wherein the first CPU rewrites the first change password to the third change password and stores the third change password in the RAM and transmits the third change password to the extension board, and wherein the second CPU rewrites the second change password to the third change password transmitted by the first CPU and stores the third change password in the memory.

17. An information process device comprising:
a mother board including:
  a first Central Processing Unit (CPU);
  a Read Only Memory (ROM) storing a first initial password, the ROM being connected to the first CPU through a buss; and
  a Random Access Memory (RAM) having a memory area capable of storing a first change password through the buss,
  wherein the mother board is connected to an output device including a display device and an input device through the buss; and
an extension board including:
  a second CPU; and
  a memory storing a second initial password and an application program, the memory being connected to the second CPU,
wherein the extension board is connectable to and detachable from the buss of the mother board through ports and is exchangeable against the mother board, wherein the first CPU determines whether or not the first change password is stored in the RAM while executing a boot program, wherein the first CPU transmits the first initial password to the extension board when it is determined that the first change password is not stored in the RAM, wherein the second CPU receives the first initial password transmitted from the mother board and verifies whether or not the second initial password stored in the memory of the extension board and the first initial password coincide with each other, wherein the second CPU outputs a command to display an error on the display device of the output device when the first initial password received from the mother board and the second initial password stored in the memory do not coincide with each other, wherein the second CPU transmits a command to display a screen for changing the second initial password on the display device when the first initial password receive from the mother board and the second initial password stored in the memory coincide with each other, wherein the first CPU displays the error on the display device of the output device when the command to display the error on the display device of the output device is received, wherein the first CPU displays an input screen of a second change password on the display device of the output device when the command to display the screen for changing the second initial password on the display device is received, wherein the first CPU rewrites the first change password to the second change password and stores the second change password in the RAM and transmits the second change password to the extension board, and wherein the second CPU rewrites the second initial password to the second change password transmitted by the first CPU and stores the second change password in the memory.

* * * * *